United States Patent

[11] 3,587,388

[72] Inventor Charles F. Muehlenweb,
 8001 Pickard Ave. N.E.,
 Albuquerque, N. Mex.
[21] Appl. No. 801,651
[22] Filed Feb. 24, 1969
[45] Patented June 28, 1971

[54] DEVICE FOR USE IN REPRODUCING CHARACTERS ON CYLINDRICAL SURFACES
 6 Claims, 6 Drawing Figs.
[52] U.S. Cl. .................................................. 90/13.1,
 90/13.3, 33/22
[51] Int. Cl. ...................................................... B23c 1/18
[50] Field of Search .......................................... 90/13.3,
 13.6, 13.9, 13.1; 33/22, 25 (A)

[56] References Cited
UNITED STATES PATENTS
1,874,046 8/1932 Jonsson ........................ 33/22

Primary Examiner—Gil Weidenfeld
Attorney—Edward L. Amonette

ABSTRACT: Device for attachment to or incorporation in engraving machines and the like, particularly those which utilize a flat master pattern to guide a cutter, scriber, or other tool for reproduction. Enables reproducing without major alterations or adjustment to machine. Workholder carriage, movable laterally and having a rotatable chuck for grasping cylindrical workpiece, is linked to cutter or reproducer to maintain workpiece in alignment therewith. Wire wrapped around workpiece and anchored to stationary brackets causes rotation of workpiece surface equal in magnitude to lateral movements of cutter and in opposite direction thereto. Linkage permits longitudinal movement of cutter without moving or rotating workpiece. Combined lateral and longitudinal movements of cutter resulting from tracing character patterns are resolved into desired translation and rotation of workpiece surface to produce faithful reproduction of master pattern.

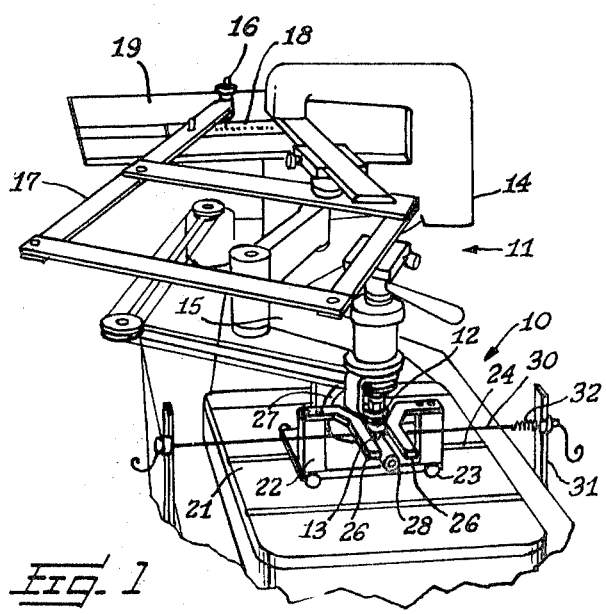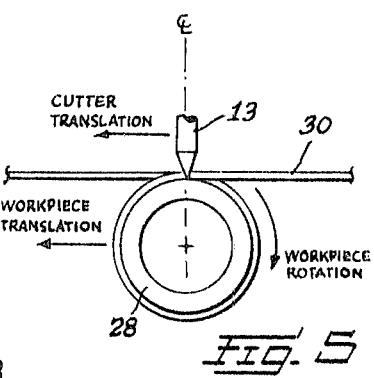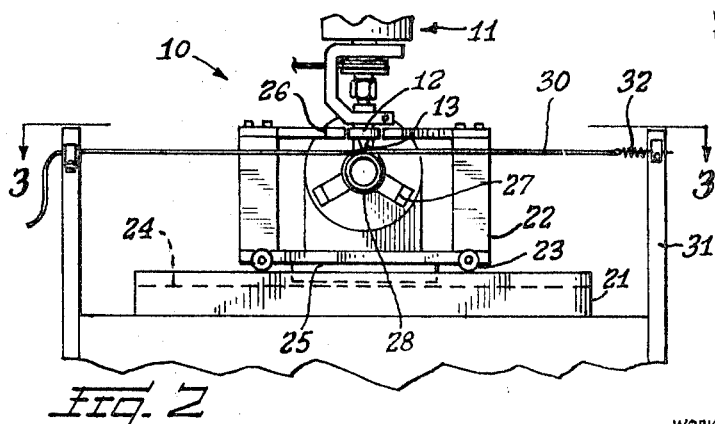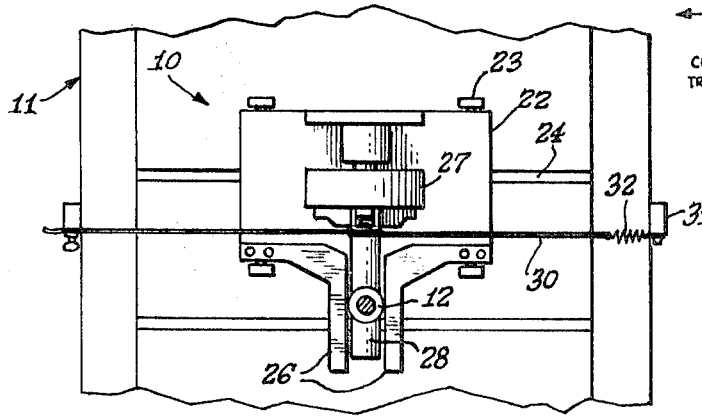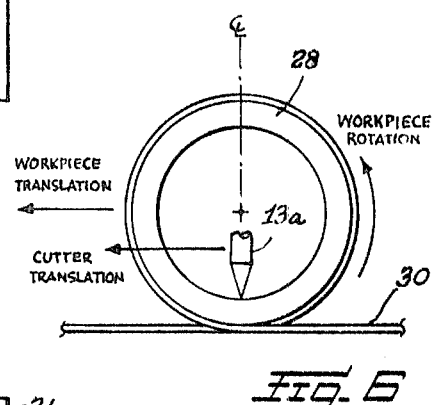

DEVICE FOR USE IN REPRODUCING CHARACTERS ON CYLINDRICAL SURFACES

BACKGROUND OF THE INVENTION

My invention relates generally to engraving machines and other similar devices wherein most commonly a cutter, scriber, pen, or other reproducing tool is linked through a pantograph and a tracing stylus to reproduce characters laid out in a flat master pattern. The majority of such machines on the market are limited to reproducing the master pattern on a flat workpiece only. Yet there is considerable demand in industry and other places for reproducing numbers, nomenclature, and other information on cylindrical objects. Those few machines which are capable of handling cylindrical workpieces utilize rather expensive gearing and scaling mechanisms for rotating the workpiece as the work proceeds. They also require adjustment each time the operator changes from one diameter workpiece to another. My invention grew out of a desire to obtain the same result more simply, directly, and inexpensively and to provide this in such a way that the device could be applied to existing machines which otherwise would have a capability only for flat work.

SUMMARY OF THE INVENTION

My invention is directed toward the problem of rotating a cylindrical workpiece in an engraving machine and the like as the work of tracing proceeds laterally across the master pattern and the work of engraving proceeds around the cylinder. Since the cutter essentially operates only in a flat working plane, the workpiece must be rotated in order to, in effect, present a flat surface to the cutter as it moves laterally in its plane, so that the engraving will have a constant depth. As the cutter moves laterally in a given direction, the cylinder centerline must move simultaneously in the same direction. At the same time, the cylinder must be rotating in the opposite direction. However, when the cutter moves longitudinally of the cylinder, the cylinder must remain stationary. Cutter movements which involve both lateral and longitudinal directions, as for example in the tracing of a circular letter such as an "O", must be resolved into lateral movements which cause rotation and translation and longitudinal movements which do not.

My invention solves these problems as follows: A workholder carriage is movable laterally in a straight line. The carriage is provided with a rotatable chuck capable of receiving workpieces of varying diameters. Guides secured to the carriage and extending therefrom parallel to the longitudinal centerline of the workpiece engage the cutter head. The cutter head is free to move within the guides in the longitudinal direction without moving the workpiece. As the cutter is moved laterally, however, the guides link its movement firmly to the carriage to maintain the relationship of the cutter and the workpiece centerline. To rotate the workpiece, a thin wire is wrapped one or two turns around the cylinder and is anchored under tension to a stationary bracket on each side of the device. As the workpiece translates laterally, the wire causes it to rotate, rotation and translation being equal in magnitude and opposite in direction. Hence, for example, as the workpiece translates to the right, opposite rotation enables cutting or reproducing to the right of what has just been done. The wire automatically adjusts to different diameter workpieces since, regardless of diameter, rotation and translation are always equal and opposite.

My inventive concept resides mainly in the provision of a laterally movable carriage and rotatable chuck for holding the workpiece; the provision of guides for interconnecting the carriage and the cutter or reproducing tool; and the provision of means for rotating the workpiece as it translates laterally.

BRIEF DESCRIPTION OF THE DRAWING

In the drawing which accompanies this disclosure:

FIG. 1 is a perspective view of a preferred embodiment of my invention seen in relation to a conventional engraving machine;

FIG. 2 is a side elevational view of the same embodiment seen in relation only to the cutter and cutter head of the same machine;

FIG. 3 is a sectional view taken on line 3–3 of FIG. 2;

FIG. 4 is a partial plan view of a particular feature of my invention;

FIG. 5 is a diagrammatic showing of the movements involved in the operation of my invention as applied to the external surface of a cylindrical workpiece; and FIG. 6 is a view showing application to the internal surface of a cylindrical workpiece.

DESCRIPTION OF THE PREFERRED EMBODIMENT

Referring now to FIG. 1, a preferred embodiment 10 of my invention is shown mounted on a typical commercial engraving machine 11. With very little change, it could also be adapted to machines which reproduce with a pen, a scriber or some other tool. It could also be used with a hand-held tool of the same type. However, for the purposes of illustration, it is shown in relation to an engraving machine as I first conceived it. Engraving machine 11 includes as part of its own mechanism a cutter head 12 with a rapidly revolving cutter tool 13 which is belt-driven from an electric motor. The cutter head 12 is movably linked to the machine frame 14 by pivotal arms 15. Cutter head 12 is connected to a tracing stylus 16 through a pantograph 17 also having one side member pivotally secured to the machine frame 14. A flat master pattern 18 comprising engraved letter and numeric characters locked in a row is secured on a horizontal table 19. Master pattern 18 is traced by stylus 16 during operation of the machine moving cutter 13 for reproducing the characters on a workpiece. Pantograph 17 links their movements and provides for enlargement and reduction from the same master pattern. Normally in such a machine the tip of the cutter moves only in a flat plane during the actual cutting operation, being lifted from that plane only when the stylus is lifted from the pattern; hence, the machine without my invention is capable only of engraving on a flat surface.

The preferred embodiment 10 of my invention enables the same machine to be used for engraving on a cylindrical surface. Referring now to FIGS. 1 through 3, this embodiment 10 includes a workholder carriage 22 having rollers 23 to enable easy movement on a carriage base 21. Base 21 may be integral with machine 11 or may be secured thereon as an attachment to the machine as I have shown it. Either way, base 21 is arranged parallel to the working plane of the cutter and is provided with a straight, laterally disposed slot 24 which is engaged by a key 25 on the underside of carriage 22 to guide movement of the carriage laterally in a straight line. Carriage 22 is equipped with a pair of spaced apart parallel guide rails 26 arranged at right angles to the line of carriage movement. Guide rails 26 engage the lateral sides of cutter head 12 in a snug manner while allowing movement of the head longitudinally therebetween. Carriage 22 is also equipped with a bearing-mounted, rotatable chuck 27 whose centerline lies directly below the center of guide rails 26 and parallel to the working plane of cutter 13. A cylindrical workpiece 28 on which characters are to be engraved is shown secured coaxially in chuck 27. Cutter 13 is disposed on the same vertical centerline as the cutter head 12; hence, when the cutter head is held between the guide rails, the cutter centerline is aligned to intersect the workpiece centerline.

By means of the parts just described, any lateral movement of the cutter head during operation is linked through the guide rails 26 to carriage 22 and chuck 27 to cause simultaneous lateral movement or translation of the workpiece 28. Longitudinal movement of the cutter head between the guide rails 26 is accommodated without causing movement of the workpiece in any direction. Thus, as the cutter 13 moves about in a flat plane, the longitudinal movements are accommodated while the lateral movements cause equal and simultaneous translation of the workpiece in the same directions as the cutter movements.

In order to enable engraving around the curved surface of the workpiece, workpiece 28 must rotate as well as translate. As the cutter moves to the right, for example, the workpiece must be made to rotate to the left or counterclockwise direction in order to engrave to the right of what has already been engraved. To provide such rotation in the proper direction and amount, the preferred embodiment of my invention 10 includes a thin wire or cable 30. Wire 30 is wrapped at least one turn around the workpiece 28, stretched preferably parallel to the carriage base 21, then anchored under tension provided by a spring 32 or other suitable means to brackets 31 which remain stationary. When a lateral movement of the cutter head occurs and the workpiece translates, friction engagement of the wire with the workpiece causes the workpiece to rotate. As seen particularly well in FIG. 5, the rotation and translation are in opposite directions. Since the workpiece, in effect, "rolls along" the stationary wire, translation and rotation are equal in magnitude.

It may be argued that as shown, rotation and translation would not be equal due to the thickness of the wire and that this differential would cause distortion in the engraving. This is the case; but experience has shown that by keeping the wire diameter small in relation to the workpiece diameter, such distortion is negligible. HOwever, FIG. 4 illustrates a means for eliminating distortion entirely. An arbor 33 having a number of sections of varying diameter is inserted between the workpiece 28 and the chuck 27. One of the sections has a diameter of sufficiently smaller size than that of the workpiece to compensate for the wire thickness; the wire is wrapped around this section and a true reproduction is obtained.

Workpieces of any diameter accepted by the chuck may be engraved without changing any machine adjustments other than the depth of cut. No adjustments whatsoever are required for my invention; the wire is simply wrapped around the workpiece (or arbor) and regardless of diameter, rotation and translation will remain equal in magnitude and opposite in direction as required.

Referring now to FIG. 6, a variant of the basic configuration heretofore described is shown in which a cutter 13a is designed in such a way as to permit engraving on the inside of a hollow cylinder. In this case the cutter works at the bottom instead of the top of the cylinder and the wire is likewise wrapped from the bottom instead of the top. As may be seen, the result is the same as before: rotation and translation remain equal in magnitude and opposite in direction.

In operating an engraving machine equipped with my invention, the operator secures the workpiece 28 in the chuck 27; adjusts the pantograph 17 to bring the cutter head 12 between the guide rails 26 and the cutter 13 to the desired starting location on the workpiece; adjusts the cutting depth; wraps the wire 30 around the workpiece and anchors it to brackets 31; and proceeds with engraving, tracing the master pattern with the stylus just as if he were engraving on a flat surface. My invention automatically provides the necessary rotation and translation of the workpiece as the cutter moves, producing a faithful reproduction of the master pattern on the cylindrical surface.

I contemplate the use of my invention in a number of applications besides engraving machines. As mentioned earlier, the type of reproducing tool used is largely immaterial to the action of my device. Even the operation of a hand-held scriber or other reproducing tool would be made simpler by the device essentially as described since it would rotate the cylindrical workpiece as the craftsman worked, making the task much like working on a flat surface.

THis completes the disclosure of a preferred embodiment of my invention. While I have described it in rather specific detail I understand that this is only by way of example and that obvious changes may be made to the device described without departing from the spirit and scope of my invention as claimed below.

I claim:

1. A device for use in reproducing characters on cylindrical surfaces from a flat master pattern and in other applications wherein a reproducing tool linked to a pantograph operates in a flat working plane, said device comprising:

a carriage movable laterally along a straight line of movement parallel to said working plane;

means carried by said carriage for rotatably securing a cylindrical workpiece thereto with the longitudinal centerline of the workpiece at right angles to said lateral line of movement and parallel to said working plane;

a guide member rigidly secured to said carriage and constantly engaging lateral sides of said tool, said guide member allowing movement of said tool in a direction parallel to said workpiece centerline independent of carriage movement, said guide member linking all lateral movements of said tool to said carriage to produce equal and simultaneous movement of said tool and said carriage in the same lateral direction;

and a wire wrapped around the circumference of said workpiece and being anchored under tension laterally outward therefrom, responsible to lateral movements of said carriage for rotating said workpiece about said centerline thereof in a direction opposite to and of a magnitude equal to said movements of said carriage.

2. The device of claim 1 wherein said guide member comprises:

a pair of spaced-apart parallel rails disposed to engage opposite lateral surfaces of said tool.

3. The device of claim 2 wherein said means carried by said carriage for rotatably securing a cylindrical workpiece thereto comprises:

a chuck rotatably secured to said carriage, said chuck having a centerline, said centerline being perpendicular to said lateral line of movement of said carriage and parallel to said working plane.

4. The device of claim 3 wherein said carriage comprises:
   a base;
   rolling means connected to said base and disposed to allow rolling in the lateral direction only;
   and upright supports for mounting said rails and said chuck.

5. The device of claim 4 wherein is further provided:
   a flat platform for supporting said carriage, said platform being parallel to said working plane of said tool and being provided with a lateral slot;
   and means connected to said carriage for engaging said slot.

6. The device of claim 5 wherein is further provided:
   a spring interposed between said wire and a point of anchorage thereof.